C. A. UFFORD.
DRESS FORM.
APPLICATION FILED NOV. 1, 1907.

921,184.

Patented May 11, 1909.
6 SHEETS—SHEET 1.

Fig. 1.

Witnesses.
W. C. Lunsford
Joseph M. Ward.

Inventor.
Charles A. Ufford,
by Kenly &c. Attys.

C. A. UFFORD.
DRESS FORM.
APPLICATION FILED NOV. 1, 1907.

921,184.

Patented May 11, 1909.
6 SHEETS—SHEET 4.

Witnesses.
W. C. Lunsford
Joseph M. Ward.

Inventor.
Charles A. Ufford.

C. A. UFFORD.
DRESS FORM.
APPLICATION FILED NOV. 1, 1907.

921,184.

Patented May 11, 1909.
6 SHEETS—SHEET 6.

Witnesses.
W. C. Lunsford
Joseph M. Ward

Inventor.
Charles A. Ufford,
by [illegible] attys.

UNITED STATES PATENT OFFICE.

CHARLES A. UFFORD, OF BOSTON, MASSACHUSETTS.

DRESS-FORM.

No. 921,184.

Specification of Letters Patent.

Patented May 11, 1909.

Application filed November 1, 1907. Serial No. 400,263.

*To all whom it may concern:*

Be it known that I, CHARLES A. UFFORD, a citizen of the United States, and a resident of Boston, in the county of Suffolk and State of Massachusetts, have invented an Improvement in Dress-Forms, of which the following description, in connection with the accompanying drawing, is a specification, like characters on the drawing representing like parts.

This invention relates to adjustable dress forms and has for its object to provide a dress form of this character which can be easily and quickly adjusted to different sizes.

One embodiment of my invention will first be described, and then the novel features thereof will be pointed out in the appended claims.

The complete dress form comprises a waist form and a skirt section. The waist form is divided vertically from side to side through the shoulders to constitute front and rear halves, and is also divided vertically from front to rear at either side of the center to subdivide each half of the waist form into side sections and center sections. The waist form is also divided transversely across the waist, and the front half of the form is further divided horizontally above the waist division line. With this manner of dividing the waist form, the latter comprises the six waist sections 3, 4, 5, 6, 7 and 8; the front shoulder sections 9 and 10; the rear shoulder sections 11 and 12; the front neck section 13 and the rear neck section 14. In addition, the second horizontal division across the front forms with the waist line division the three bust sections 15, 16 and 17. These various sections are all adjustably secured together to permit the form to be expanded or contracted and to permit the waist thereof to be lengthened.

Each neck section has rigidly secured thereto two slotted members 18 which overlie the adjacent shoulder sections near their tops, and each shoulder section carries a clamping-bolt 19 which extends through the slot in the member 18 and by which the slotted member can be adjustably clamped to the shoulder section. Each neck section also has pivoted thereto at its lower end, at 22, two other slotted members 20 which overlie the lower portions of the shoulder sections and are adjustably secured thereto by clamping bolts 21.

The slotted members 20 are pivoted to the neck sections at 22 while the slotted members 18 are rigidly secured to the neck sections. This construction is adopted because in expanding the form to broaden the shoulders, it is necessary to turn the shoulder sections slightly about the pivotal points 22 in order to maintain the proper proportions of the form.

The central waist section 7 of the back half of the form has pivoted thereto at 2 two slotted members 23 which overlie the upper portions of the said waist sections 6 and 8 and are clamped thereto by suitable clamping bolts 24 carried by said waist sections. The neck section 14 of the rear half also has secured thereto a slotted member 25 which extends downwardly and overlies the upper portion of the central waist section 7 and is secured thereto by a clamping bolt 26 carried by said central waist section.

The front neck section 13 has rigidly secured thereto a slotted member 27 which extends down over the center bust section 16, and the center waist section 4 of the front half has rigidly secured thereto a slotted member 28 which extends up over the center bust section 16 and overlies the lower portion of the neck section 13, said center bust section 16 having a loop or guide 90 through which the member 28 passes. This guide not only guides the member 28, but also serves to hold the lower end of the center bust section 16 in proper position.

A clamping bolt 29 carried by the center bust section 16 extends through the two slotted members 27 and 28 and acts as a means for holding the neck section 13 in its vertically adjusted position relative to the waist section 4, and also as a means for holding the central bust section 16 in its vertically adjustable position.

Each side waist section of the front half has rigidly secured thereto a slotted member 30 which extends upwardly to overlie the corresponding side bust section, and the central bust section 16 has pivoted thereto at its lower end two slotted members 31 which extend outwardly and overlie the side bust sections 15, 17. Each side bust section carries a clamping screw 32 which passes through the corresponding slotted members 30 and 31 and serves as a means for adjustably holding each side bust section in its desired vertical and lateral position. Each side bust section also has secured thereto at its top a slotted member 91 which extends upwardly and overlies the adjacent shoulder section and is adjustably secured thereto by the clamping screw 21.

For adjustably securing together the meeting sections under each arm or at the side of the form, I secure to each side waist section at the rear of the form two slotted members 35 and 36, the members 35 extending upwardly to overlie the lower portion of the rear shoulder section and the member 36 extending forwardly to overlie the upper corner of the side waist section of the front half; and I also secure to each front shoulder section two slotted members 37 and 38, the member 37 extending rearwardly to overlie the rear shoulder section, the member 38 extending downwardly to overlie the bust section and the side waist section of the front half; and in addition I secure to the bust section a slotted member 39 which overlies the said waist section of the front half. The rear shoulder section has rigidly secured thereto an adjusting screw 40 which extends through the slots in the slotted members 35 and 37, and the front waist section on the side has rigidly secured thereto an adjusting screw 41 which extends through the three slotted members 38, 39 and 36. The slotted member 36 is preferably pivoted to the side waist section, and the slotted members 37 and 38 are also preferably pivoted to the front shoulder section. With this construction, two clamping screws 40 and 41 serve to provide all the necessary adjustments between the five meeting sections at each side of the form.

The bust sections have been cut so that they can be readily adjusted either vertically, laterally or outwardly, and so that in all their adjusted positions they will conform accurately to the human figure. To secure this end the division line separating them from the shoulder and neck sections drops at the side of the form, so that although the bust sections extend around to the side division they are comparatively narrow at this point, as at 50. This gives the bust sections the fullness at the points desired, and at the same time affords an easy manner of adjusting them either vertically or laterally. At the bottom of the waist portion of the form, each waist section has rigid therewith a sector-shaped bottom piece, the bottom pieces for the sections of the front half being designated 51, 52 and 53, and those for the rear half 54, 55 and 56. For adjustably connecting these bottom pieces together, I provide the T-shaped member 57 having the two opposed slotted arms 58 which overlie the bottom pieces 52, 55, and the other two opposed slotted arms 59. The bottom pieces 54 and 56 each have connected therewith a slotted member 60 which overlies the corresponding slotted arm 59, and the bottom pieces 53 and 51 also each have connected therewith a slotted member 610 which also overlies the arm 59. Said slotted members 60 and 610 are clamped to the arms 59 by clamping bolts 61. The bottom pieces 52 and 55 are secured to the arms 58 by clamping bolts 63. The skirt portion of the form is also divided vertically into sections, there preferably being as many such sections as there are in the waist portion of the form.

Figures 6, 7, 8, 9:
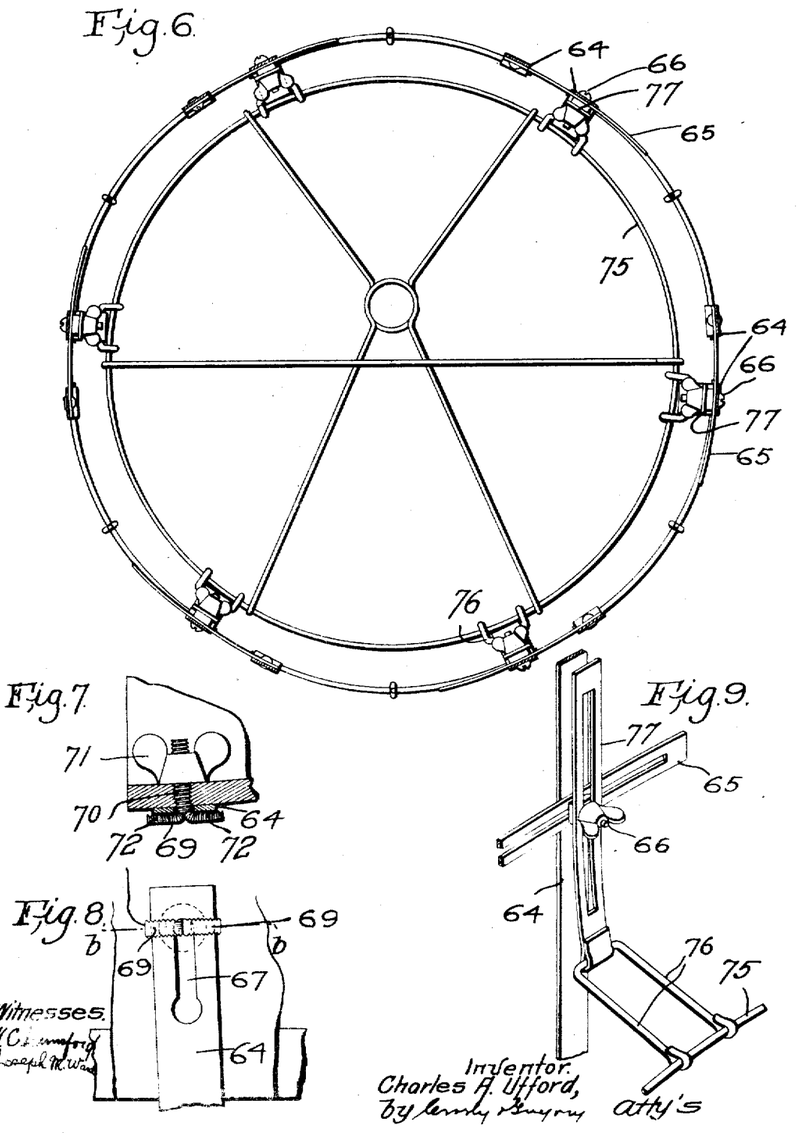
Fig. 6 is an enlarged section through the skirt section on the line $c-c$, Fig. 1.
Fig. 7 is a detail showing the manner of securing the skirt section to the waist, said figure being taken on the line $b-b$, Fig. 8 with the screw shown in plan.
Fig. 8 is a side view of the device shown in Fig. 7.
Fig. 9 is a detail of the means for adjusting the centering frame 75.

In the present embodiment each skirt section has the two side pieces 64 which are suitably connected by wire work. The skirt sections are adjustably connected together by means of slotted members 65, each of which is secured to a side piece 64 of one section and overlies the side piece 64 of another section and is secured thereto by clamping screws 66. The skirt portion is made detachable from the waist section by extending the side pieces 64 upwardly and providing each with a slot 67 through which extends a clamping screw of the construction shown in Figs. 7 and 8. This clamping screw has the elongated head 69 and the screw-threaded shank 70 on which is screw-threaded the clamping nut 71. The elongated head 69 is preferably provided with serrations 72 on its under face which engage the side pieces 64 and firmly hold the skirt section to the waist section. To detach the skirt portion, the clamping nut 71 is loosened and the clamping screw turned to bring the head 69 in line with the slot 67 when the side pieces may be withdrawn from the bolt. The skirt portion is provided with the usual centering frame 75 to which the skirt sections are secured and which serves to hold the skirt sections in their proper position.

For connecting the skirt sections to the centering frame, the latter has hinged thereto a plurality of link members 76 to each of which is hinged a slotted member 77 which is secured to the skirt section by the clamping screw 66. This forms a double hinged connection between each skirt section and the centering frame 75, thus permitting the skirt sections to be readily adjusted outwardly without any binding or cramping.

Figure 13:
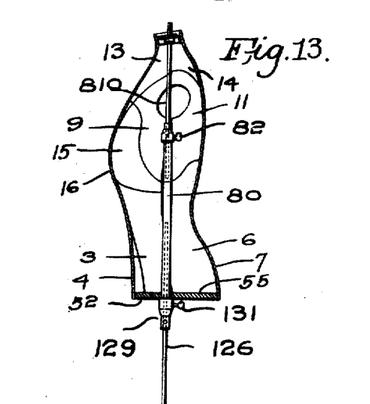
Fig. 13 is a vertical central section of the form having a supporting rod therein which is especially adapted to be used with the box or case.

80 is a rod, tube or other support which extends up through the centering frame 75 and which sustains the form. This support may be in the form of a rod, in which case the upper end thereof will telescope into a tubular member 81 which is secured to and depends from the neck sections, all as shown in my co-pending application Se. No. 361,102, filed March 7, 1907, or said support may be in the form of a tube, as shown in Fig. 13, in which case it will telescope over a rod 810 that is secured to and depends from the neck sections. The member 80 is clamped to the rod 810 or tubular member 81 by a clamping screw 82.

In lengthening the waist of the figure the clamping screw 82 is loosened, and the shoulder sections of the form are then adjusted vertically or separated from the waist sections, and when the desired adjustment has been made, the clamping screw 82 is tightened thus holding the form in its adjusted position.

The member 81, or the member 810, fits the support 80 loosely, thus permitting the neck of the form to be thrown forwardly or backwardly. If the form is to be adjusted to correspond to the figure of a flat-chested round-shouldered person, the rear shoulder sections will be elevated and the front shoulder sections depressed slightly, thus throwing the neck forward, the loose connection between the support 80 and the tubular member 81, or rod 810, permitting this to be done.

Figure 1:
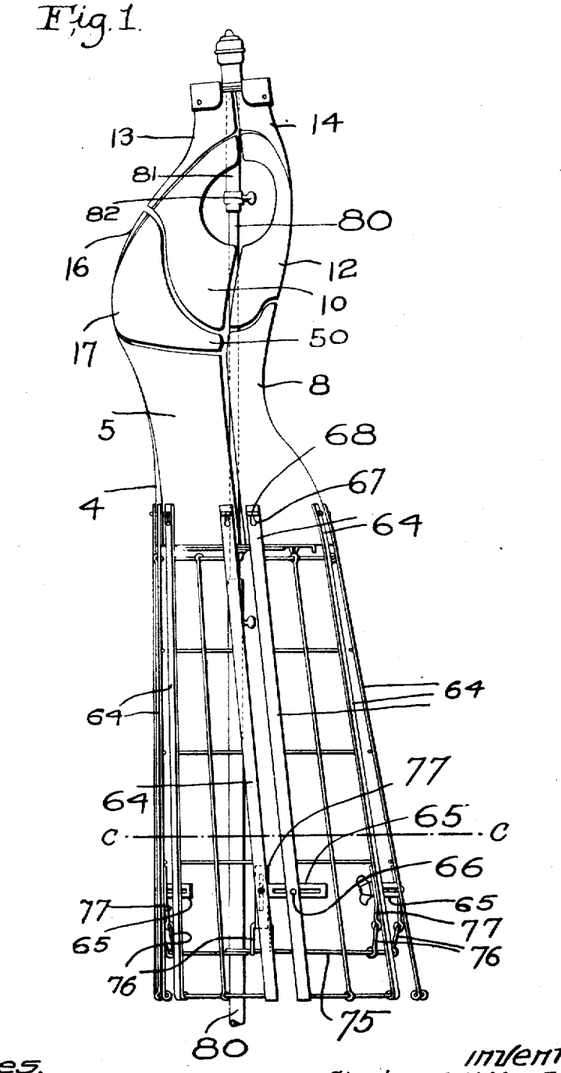
Figure 1 is a side view of a dress form embodying my invention.
Figure 2:
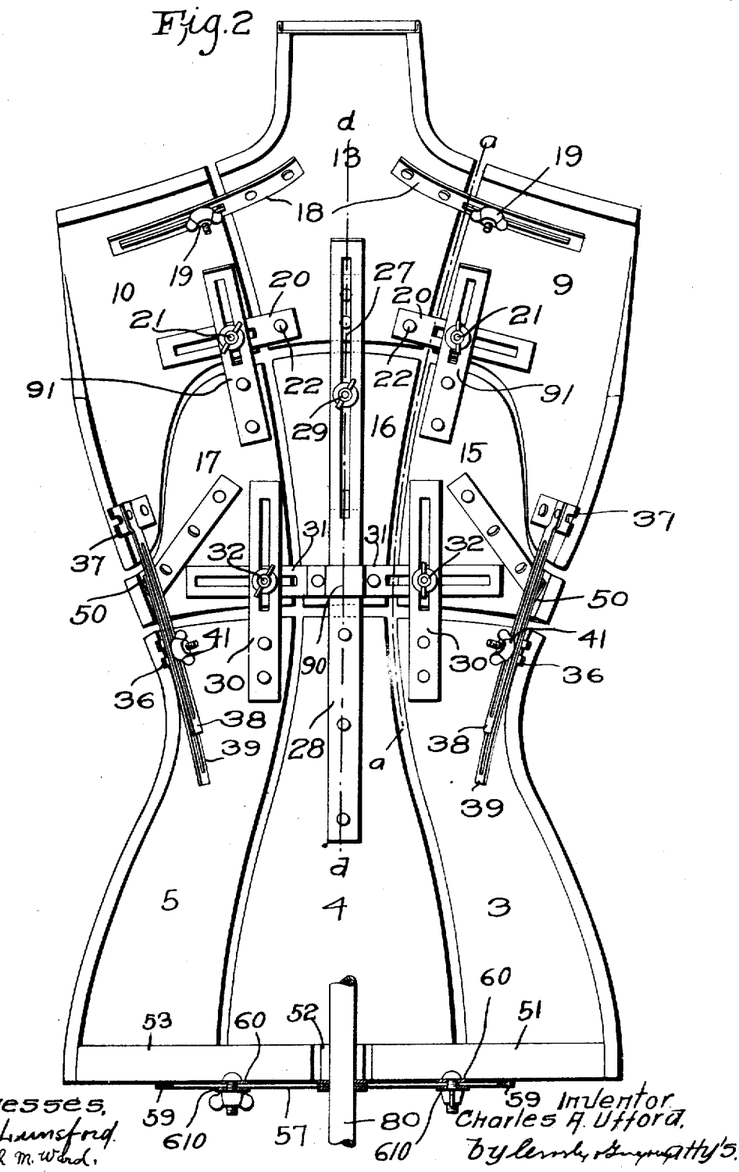
Fig. 2 shows the front half of the waist form looking from the inside of the form.
Figure 3:
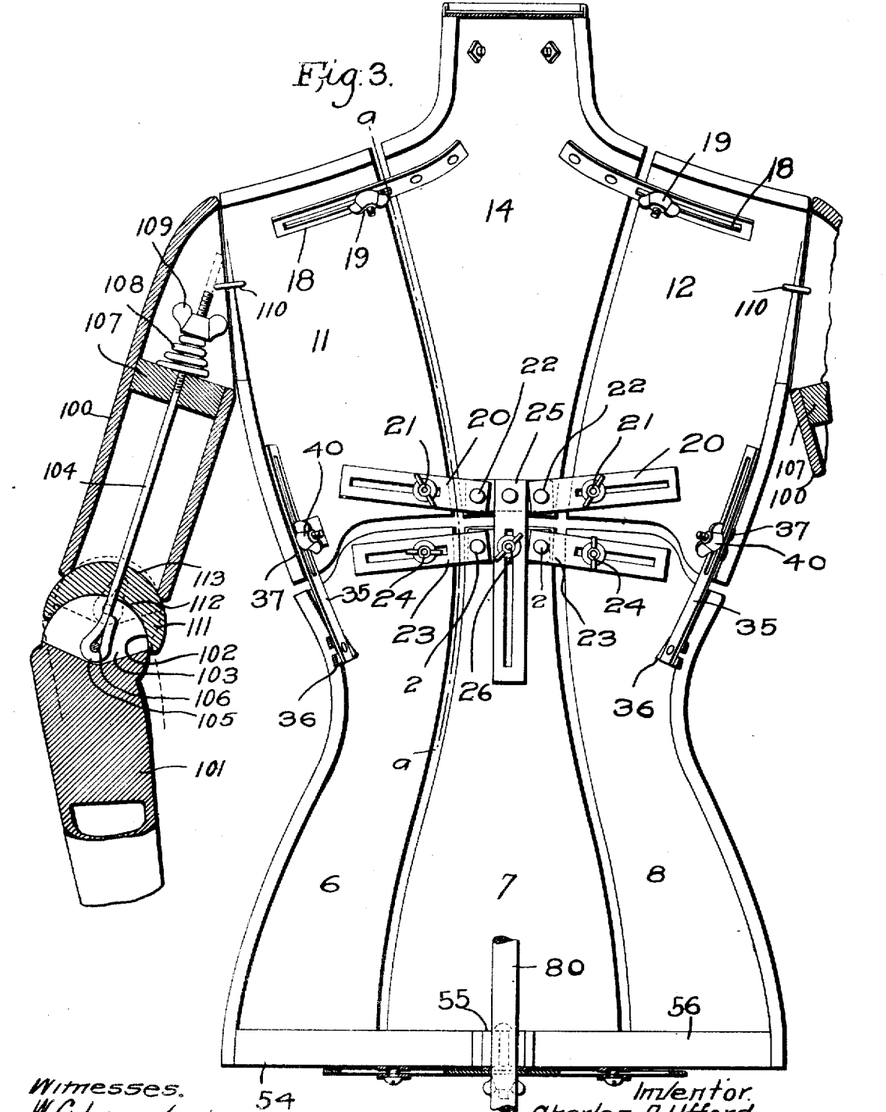
Fig. 3 is a similar view showing the inside of the back half of the waist form looking from the inside of the form.

My invention also comprises a new arm which can be easily bent into any desired position and retained therein. The arm I have herein shown comprises two sections, one of which is provided with a ball, and the other of which has a socket fitting said ball. The ball is slotted and has received within the slot a tension member which is pivoted to the ball and which extends through the other or socket section, and the end of which is exposed at the end of the socket section. The arm is best seen in Fig. 3, wherein the upper portion 100 constitutes the socket section, and the lower or fore-arm portion 101, constitutes the ball section. These sections of the arm may be made of any suitable material, such, for instance, as papier mâché, and the ball section 101 is formed at its ends with the ball 102 which is adapted to be received in a socket formed in the socket section 100. This ball section is slotted, as shown at 103, Fig. 3, and the end of a tension member 104 is entered into said slot, said end being provided with a loop 105 which is swiveled on a pin 106 carried by the ball. The tension member 104 extends through the socket section 100 of the arm and the end of said tension member is exposed at the end of the socket section. The said socket section is herein shown as provided with the bridge piece 107 against which rests a spring 108, and this spring is confined between the bridge piece and the nut 109 on the exposed end of the rod or tension member 104.

The arm is designed to be detachably secured to the form by any suitable means, such as hooks 110, and when the arm is thus attached, the nut 109 is exposed, so that it can be readily manipulated. After the two sections of the arm have been bent to the proper position, they may be held in this position merely by tightening the nut 109 and thus drawing the ball into the socket with sufficient friction to hold the two parts of the arm in their adjusted position. It often happens that in using a form it is desirable to adjust the angular relation of the two sections of the arm after the sleeve of a garment has been applied to the arm or after the arm has been draped. With my invention, this can be readily done without disturbing the draping because the nut 109 is exposed at the end of the arm. I have also provided a simple expedient for lengthening or shortening the arm. This is accomplished by the use of a spacing member 111 which may be inserted between the ball section and the socket section if it is desirable to lengthen the arm. This spacing section is provided with a concaved face 112 adapted to fit the ball and is also provided with a convex face 113 which fits the socket of a socket section, and said spacing member has an aperture through which the tension rod 104 extends.

Figure 11:
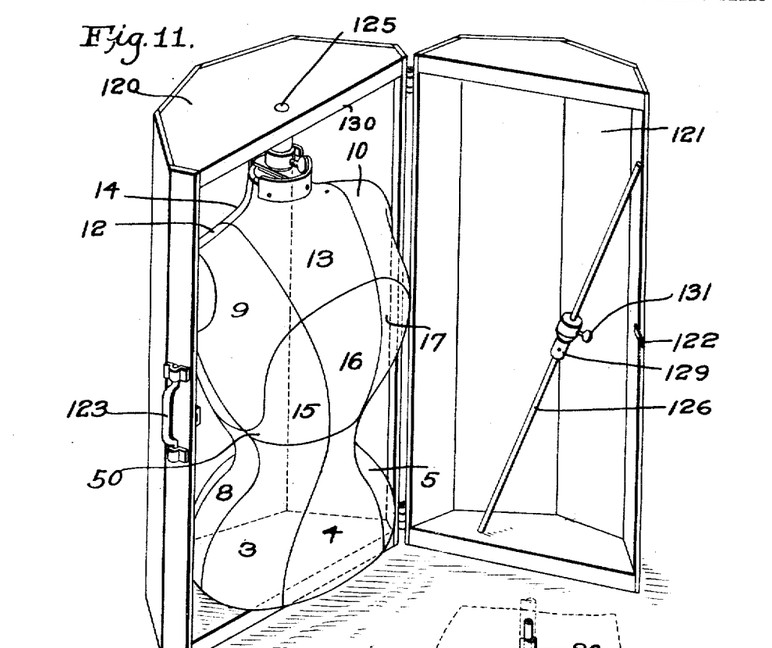
Fig. 11 is a perspective view of a box or case within which the form may be packed for storage or shipping.
Figure 12:
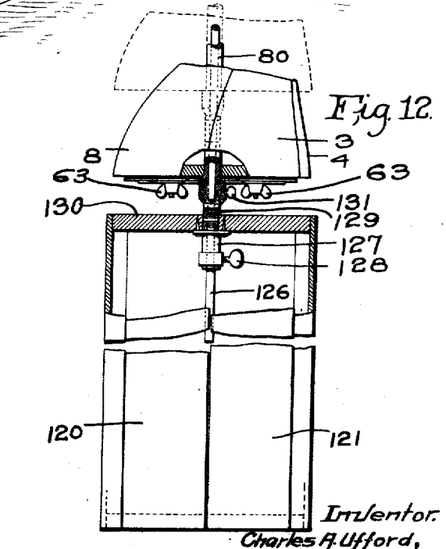
Fig. 12 is a view showing how the box or case may be used as a stand to support the form.

In Figs. 11 and 12 I have shown a carrying case which has been especially designed so that the form can be packed, and said case can be used for transporting the form from one place to another. The carrying case illustrated is also designed so that it can be used as a support or base for the form and if desired it can be used as a skirt section of the form. As shown in Fig. 11, this carrying case comprises the two parts 120, 121, which are hinged together and which are shaped so that the waist form, and if desired, the skirt section of the form also, can be packed therein. The two parts of the form are hinged together and when closed may be locked by any suitable catch or locking device 122, and the case is also provided with a handle 123 by which it may be conveniently carried. For adapting the carrying case to support the form, I have in the present embodiment shown the top of the carrying case as provided with an aperture 125 through which the supporting rod of the form may be inserted.

In the embodiment shown in Figs. 11 and 12, the supporting member of the form extends through the waist part thereof and is shown in the form of a tube, and this has associated therewith an extension rod 126, the upper end of which telescopes into the lower end of the tube 80, as shown in Fig. 13, and the lower end of which is adapted to be set into the aperture 125. The top 130 of the case has the collar 127 secured thereto and depending therefrom, which collar carries a clamping screw 128 by means of which the extension rod 126 may be held in its adjusted position. This rod 126 has fast thereto a collar 129 on which the lower end of the tube 80 rests. With this construction the waist form can be supported on a carrying case in such relation thereto that the carrying case may, if desired, be used as the skirt section of the form, as shown in full lines Fig. 12. If it is desired to elevate the waist part of the form, the set screw 128 may be loosened and the extension rod adjusted vertically in the collar 127, as shown by dotted lines Fig. 12, or the tube 80 may be adjusted vertically on the extension rod 126 and locked in its adjusted position by a set screw 131. This extension member can be readily withdrawn from the form, as shown in Fig. 11, thus permitting the form to be packed in the carrying case.

My improved dress form is especially adapted to be used as a centering form in the manufacture of a non-adjustable form of any desired shape. When it is to be used in this way I provide filling sections which are of the same shape as the sections of the waist form, and which are adapted to be placed over said sections. These filling sections are arranged to be detachably secured to the waist sections, and when in place they merely add to the thickness of said waist sections.

In using my improved form as a pattern on which to build a non-adjustable form I place the filling sections on the sections of the waist form and then place on the form a waist fitted to the person whose form is to be duplicated, and after the waist has been placed on the form the sections of the form are adjusted to fill the waist and are clamped in position. When the waist is removed the form thus adjusted is a duplicate in size of said person. The filling sections are then removed from the form and said form is used as a center on which papier mâché is built up to the thickness of the filling sections, and when said papier mâché has dried this papier mâché cover may be slit down one side sufficiently to enable the adjustable centering form to be removed, and after it has been removed the one piece papier mâché form thus made can be laced together at the side where it was slit, thus making a non-adjustable form which exactly duplicates in size said person.

Figures 4, 5, 10:
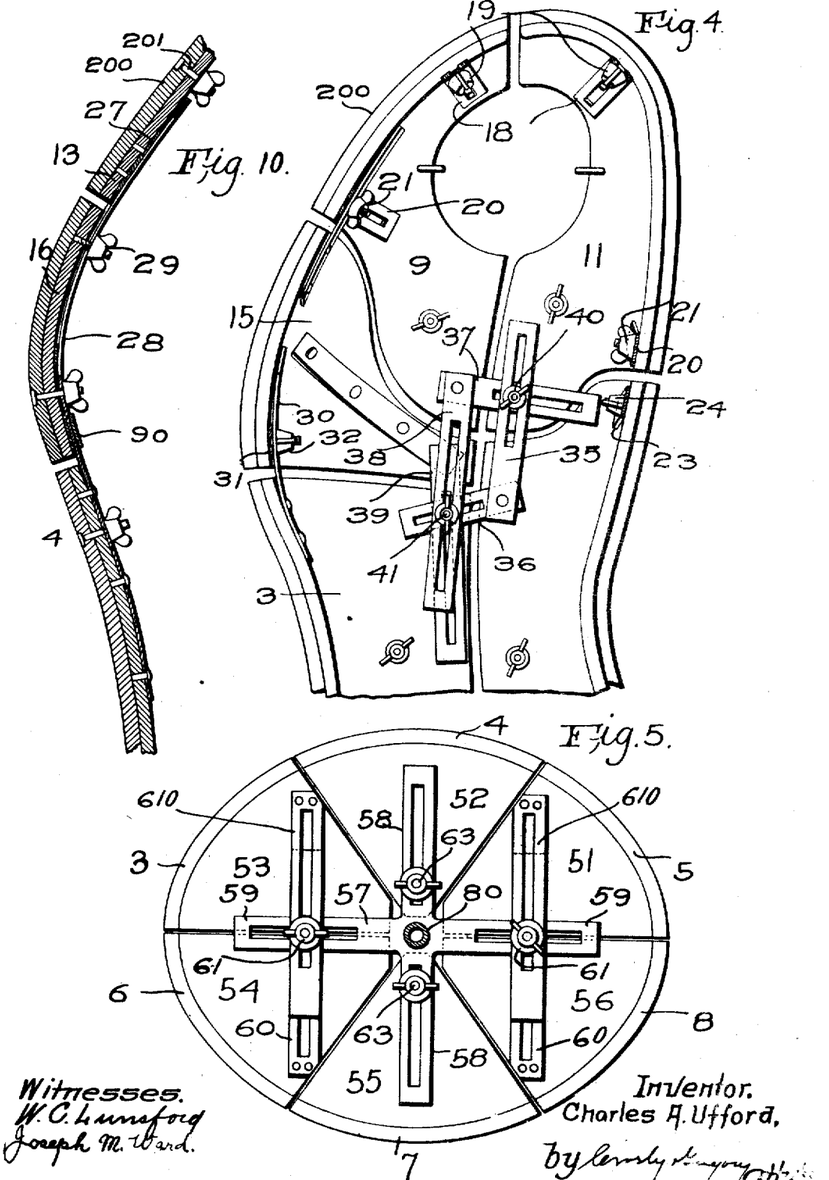
Fig. 4 is a section on the lines $a-a$, Figs. 2 and 3.
Fig. 5 is a bottom plan view of the waist form.
Fig 10 is a section on the line $d-d$, Fig. 2.

In Figs. 4 and 10 I have shown the filling sections attached to the sections of the form, each filling section being designated 200. Each filling section is co-extensive with the form section to which it is applied, and is detachably secured to the form section by means of a suitable bolt 201. These filling sections do not interfere in any way with the adjusting of the form, because the filling sections are all independent from each other and each is independently secured to its particular form section.

Having fully described my invention, what I claim as new and desire to secure by Letters Patent is:—

1. A dress form divided vertically across the shoulders from side to side to constitute front and rear halves, the rear half being divided horizontally in one place to constitute shoulder and waist portions, and the front half being divided in two places to constitute a shoulder portion, bust portion and waist portion, two slotted members secured to the front shoulder portion on each side, one of said members overlying the rear shoulder portion, and the other overlying the waist and bust portions, a slotted member secured to the bust portion and overlying the front waist portion, two slotted members secured to the rear waist portion, one overlying the rear shoulder portion and the other the front waist portion, and clamping screws secured to the front waist portion and rear shoulder portion and clamping said members together.

2. A dress form divided vertically from side to side through the shoulders and from front to rear each side of the center, and divided horizontally across the bust, thereby to divide the form into front and rear shoulder sections and front and rear neck sections, a slotted member pivoted to the lower corner of one neck section and overlying the adjacent shoulder section, another slotted member rigidly secured to the form below the horizontal line and overlying said shoulder section, and a clamping bolt carried by the shoulder section and securing said slotted members together.

3. A dress form divided vertically through the shoulders to constitute front and rear halves, said front half being divided horizontally in two separate places to constitute a waist portion, shoulder portion and bust portion, the lower division line being substantially straight and the central portion of the upper division line being substantially straight and parallel with the lower division line, said upper division line curving downwardly and converging at its ends toward the lower division line, whereby the bust portion is narrower at the sides of the form than at the central portion thereof.

4. In a dress form comprising a body portion, the combination with a sectional arm, one section having a ball-shaped slotted end, the other section having a socket to fit the ball, a tension member extending longitudinally of the socket section and entering the slot in the ball section, said tension member being exposed at the end of the socket section, means to pivot said tension member to the ball section, a spring at the exposed end of the tension member, and a nut screw-threaded thereon and having engagement with the spring.

5. In a dress form, the combination with a body portion, of a skirt portion having slotted suspension members and a headed clamping screw extending through the slot of each suspension member and into the body portion, the heads of the screws engaging the suspension members and being serrated.

6. A dress form divided horizontally across the front in two different planes to constitute a waist portion, a bust portion and a shoulder portion and divided vertically from front to rear either side of the center, a slotted member rigidly secured to the center waist section and overlying the center bust section, a guiding loop at the lower end of the center bust section through which said slotted member passes, and a clamping screw carried by said center bust section and engaging said slotted member.

7. A dress form divided to form a plurality of sections and means to adjust said sections relative to each other to expand or contract the form, combined with rigid filling sections having the same contour as the sections of the dress form and shaped to fit the exterior of said dress form sections, and means to detachably secure each filling section to the corresponding dress form section.

In testimony whereof, I have signed my name to this specification in the presence of two subscribing witnesses.

CHARLES A. UFFORD.

Witnesses:
MARGARET A. DUNN,
BERTHA F. HEUSER.